(12) United States Patent
Zampieri

(10) Patent No.: US 6,890,382 B2
(45) Date of Patent: May 10, 2005

(54) SELF-LEVELING CEMENT MIX FOR FILLING UP AND SEALING DIGGINGS OF CHANNELS, TRENCHES, SEWAGES AND THE LIKE AND FOR BUILDING WORKS IN GENERAL

(75) Inventor: Mirella Zampieri, Montegrotto Terme (IT)

(73) Assignee: KAPPA 6 S.r.l., Sacile (IT)

( * ) Notice: Subject to any disclaimer, the term of this patent is extended or adjusted under 35 U.S.C. 154(b) by 0 days.

(21) Appl. No.: 10/441,355

(22) Filed: May 20, 2003

(65) Prior Publication Data

US 2003/0213411 A1 Nov. 20, 2003

(30) Foreign Application Priority Data

May 20, 2002 (IT) ...................................... PN2002A0033

(51) Int. Cl.⁷ ................................................. C04B 7/02
(52) U.S. Cl. ........................ 106/713; 106/705; 106/737
(58) Field of Search ................................. 106/705, 713, 106/737

(56) References Cited

U.S. PATENT DOCUMENTS 4,126,005 A * 11/1978 Coursen
4,131,480 A * 12/1978 McCurrich et al.
5,316,572 A    5/1994 Okamura et al.
5,378,279 A    1/1995 Conroy
6,309,457 B1 * 10/2001 Guerinet et al. ............ 106/727

FOREIGN PATENT DOCUMENTS

| CH | 678 524 A |   | 9/1991 |
| DE | 3529823 | * | 9/1986 |
| JP | 60096558 | * | 5/1985 |
| JP | 63129052 | * | 6/1988 |
| JP | 03252340 | * | 11/1991 |
| WO | WO 00 66512 A |   | 11/2000 |

* cited by examiner

Primary Examiner—Paul Marcantoni
(74) Attorney, Agent, or Firm—Bucknam and Archer

(57) ABSTRACT

A self-leveling cement mix employed for filling up and sealing excavations of channels, trenches, sewages and the like and for building works of various kinds. The cement mix includes large-sized sand of various kind having a median grain size of 3 mm, fine-sized sand of various kind having a median grain size of 1.5 mm, volatile ash as a remnant product of coal combustion, conventional type cement, cement aerating agent, fluidifying agent, and water.

11 Claims, No Drawings

SELF-LEVELING CEMENT MIX FOR FILLING UP AND SEALING DIGGINGS OF CHANNELS, TRENCHES, SEWAGES AND THE LIKE AND FOR BUILDING WORKS IN GENERAL

FIELD OF THE INVENTION

The invention relates to a self-leveling cement mix which is employed for filling up and sealing excavations of channels, trenches, sewages and the like and for building works of various kinds.

BACKGROUND OF THE INVENTION

At the present, for filling up the excavations effected on the ground for laying pipings, sewages and the like, after these pipings, sewages, etc. have been laid they are covered with compacting material so as to keep them in position and to close the excavations, and as material therefor concrete of conventional kind is normally used, which is poured in position, or some embankment earth or loose tombstone material (sand, crushed stone, coarse gravel) is utilized, or a combination of materials, concrete and embankment earth or tombstone material which are suitably mixed with each other are utilized.

The use of the above-mentioned filling and compacting materials, however, gives raise to some drawbacks. In fact, first of all these materials are not able to perform effective sealing of the pipings, sewages and the like which have been laid underground, due to the difficulty of these materials to distribute themselves for filling all the areas around the pipings and sewages, and under these circumstances inadequate sealing may sometime occur at the junctions of such pipings and sewages, with consequent outgoing and loss of the fluid transported through such pipings and sewages. This phenomenon tends to occur when using both fluid concretes and embankment earth or loose tombstone material, and with these later materials which are denser and less fluid the above phenomenon is particularly emphasized, owing to the greater difficulty of these materials to uniformly distribute themselves on all the positions of pipings and sewages.

Another drawback of the use of the current materials is due to the difficulty of arranging the excavation filling and sealing material which is submitted to continuous loads produced by vehicular traffic passing over the same material and tends to yield slowly and progressively, particularly in the case in which the material is embankment earth or tombstone material, and this material has been covered with a road surface. Also in this case, the use of compacted tombstone material involves a more accentuated phenomenon, since a slow and progressive crushing in position of the weaker tombstone elements and a penetration of the stiffer tombstone elements on the more yieldable original ground may occur.

Finally, the use of these filling and sealing materials involves the drawback that the same materials are difficult to remove, when such removal is needed for maintenance or repair works of pipings, sewages etc. and it is very difficult and burdensome if the used material is concrete.

SUMMARY OF THE INVENTION

The object of the present invention is to eliminate the above drawbacks and applicative limits deriving from the use of the current materials, by means of the use of the cement composition according to the present invention, which is adapted to provide for an effective filling, compacting and sealing of excavations for piping, sewages etc., laid underground, and it is absolutely stable over time and easily removable in the cases of need for performing the above-described works.

DETAILED DESCRIPTION OF THE INVENTION

The invention will be better understood from the following description, given solely by way of not-limitative example. The self-leveling cement mix in accordance to the invention is constituted substantially by the following components:

1) large-sized sand of various kind, with median grain size preferably of 3 mm;
2) fine-sized sand of various kind, with median grain size preferably of 1.5 mm;
3) volatile ash, this term being intended as a remnant product of coal combustion, as for example in thermoelectric power plants;
4) cement of conventional type and preferably but not necessarily Portland 325 cement;
5) aerating agent for cements;
6) fluidifying agent, constituted by a mixture of surface-active agents and dispersants; and
7) water.

The above components are mixed with each other at ambient pressure and temperature, with the following proportions:

1) large-sized sand from 1 to 10,000 Kg/cu.m., preferably 840 Kg/cu.m.;
2) fine-sized sand from 1 to 10,000 Kg./cu.m., preferably 780 Kg/cu.m.;
3) volatile ash from 0,5 to 90 Kg/cu.m., preferably 25 Kg/cu.m.;
4) cement from 0.5 to 500 Kg/cu.m., preferably 60 Kg/cu.m.;
5) aerating agent for cements from 0,1 liter/cu.m. to 50 liter/cu.m., preferably 0,8 liter cu.m.;
6) fluidifying agent from 0,1 liter/cu.m. to 50 liter cu.m., preferably 1,8 liter cu.m,;
7) water from 1 Kg/cu.m. to 500 Kg/cu.m. preferably 155 Kg/cu.m.

Instead of sands, as components under 1) and 2) also inert materials of various kind for the building industry, with the same proportion may be used. Instead of volatile ash, as component under 3) also hydraulic lime, with the same proportion, may be used. As aerating agent for cement, also the product named RH878, of the firm MAC S.p.A., via Vic. Corti 21, Treviso, Italy, may be advantageously used and as fluidifying agent the product named MVR of the above same firm may be advantageously used. As alternative, as aerating agent and fluidifying agent also the product named RIVEREN ITI, 27P of the firm Rental Colloid of Valdobbiadene (TV), via Pra Fontana 55/1, Italy may be advantageously used.

The resulting cement composition is used for filling up and compacting the excavations where pipings, sewages and the like have been laid underground, and thanks to its excellent fluidity it has the capacity to distribute itself to all positions, thereby filling up and sealing effectively all the pipings and sewages laid underground, as well as the effected excavations, thereby preventing any outgoing and loss of the fluids transported through the pipings and sewages, as well as permitting a quick settling of the material without possibility that it may yield subsequently, after hardening thereof, so as to ensure a high ground compactness and an absolute stability over time.

Finally, thanks to the limited resistance to tensile stress of this material, it may be easily removed in a simple and quick manner without difficulty, when necessary to perform subsequent maintenance or repair works of the pipings and sewages.

The cement mix according to the invention may be advantageously utilized also for further applications, such as for example:

a) for floor foundations, whereby it allows a perfect leveling of the laying plane surfaces of the foundations for buildings, swimming pools, sheds, etc., by replacing the conventional leans;
b) for bases, whereby it is particularly suitable in the building industry for manufacturing of floor bases;
c) insulating mix, whereby it is employed alone or mixed with other light components (expanded clay, vermiculite, pumice, lapilli) for manufacturing of high insulating elements, for elevated structures (filling of box-like masonries) and horizontal or non-horizontal structures (flat roofs or roofs with variable inclination);
d) filling up of hollow spaces in the ground, e.g. of old reservoirs to make inert, etc.,
e) sound absorbing panels for sheds and building industry in general;
f) civil and road building, bridges, viaducts, etc.

Accordingly, while a few embodiments of the present invention have been shown and described, it is to be understood that many changes and modifications may be made thereunto without departing from the spirit and scope of the invention as defined in the appended claims.

What is claimed is:

1. A self-leveling cement mix having the fluidity for completely filling up and sealing excavations of channels, trenches, sewages after the pipings, sewages have been laid, and for building works in general comprised by mixing together at ambient temperature and pressure the following components:
    (a) from 1 to 10,000 Kg of large sized sand with a grain size of 3 mm, per cubic meter of the mix;
    (b) from 1 to 10,000Kg of fine sized sand with a grain size of 1.5 mm, per cubic meter of the mix;
    (c) from 0.5 to 90 Kg of volatile ash or hydraulic lime, per cubic meter of the mix;
    (d) from 0.5 to 500 Kg of Portland cement, per cubic meter of the mix;
    (e) from 0.1 liter to 50 liters of an aerating agent, per cubic meter of the mix;
    (f) from 0.1 liter to 50 liters of a fluidifying agent, per cubic meter of the mix; and
    (g) from 1 to 500 Kg water, per cubic meter of the mix.

2. The self-leveling cement mix according to claim 1, wherein the large sized sand comprises 840 Kg, per cubic meter of the mix.

3. The self-leveling cement mix according to claim 1, wherein the fine sized sand comprises 780 Kg, per cubic meter of the mix.

4. The self-leveling cement mix according to claim 1, wherein the volatile ash comprises 25 Kg, per cubic meter of the mix.

5. The self-leveling cement mix according to claim 1, wherein the Portland cement comprises 60 Kg, per cubic meter of the mix.

6. The self-leveling cement mix according to claim 1, wherein the aerating agent comprises 0.8 liter, per cubic meter of the mix.

7. The self-leveling cement mix according to claim 1, wherein the fluidifying agent comprises 1.8 liter, per cubic meter of the mix.

8. The self-leveling cement mix according to claim 1, wherein the water component comprises 155 Kg, per cubic meter of the mix.

9. The self-leveling cement mix according to claim 1, wherein the lime comprises 25 Kg, per cubic meter of the mix.

10. The self-leveling cement mix according to claim 1, wherein the fluidifying agent comprises a mixture of surface-active agents.

11. A self-leveling cement mix having the fluidity for completely filling up and sealing excavations of channels, trenches, sewages after the pipings, sewages have been laid, and for building works in general comprised by mixing together at ambient temperature and pressure the following components:
    (a) 840 Kg of large sized sand with a grain size of 3 mm, per cubic meter of the mix;
    (b) 780 Kg of fine sized sand with a grain size of 1.5 mm, per cubic meter of the mix;
    (c) 25 Kg of volatile ash, per cubic meter of the mix;
    (d) 60 Kg of Portland cement, per cubic meter of the mix;
    (e) 0.8 liter of an aerating agent, per cubic meter of the mix;
    (f) 1.8 liter of a fluidifying agent, per cubic meter of the mix; and
    (g) 155 Kg of water, per cubic meter of the mix.

* * * * *